United States Patent [19]
Shu

[11] Patent Number: 6,058,441
[45] Date of Patent: May 2, 2000

[54] USB MULTI-FUNCTION CONNECTING DEVICE

[76] Inventor: Han Shu, 7F, No. 289-2, Chung-Hsing Rd., Hsing-Tien, Taipei Hsieu, Taiwan

[21] Appl. No.: 09/026,425

[22] Filed: Feb. 19, 1998

[51] Int. Cl.[7] .................................................. G06F 3/00
[52] U.S. Cl. ................................. 710/100; 710/2; 710/8; 710/62; 710/100; 710/101; 710/103; 710/126; 710/129
[58] Field of Search ..................... 370/402; 710/100–105, 710/126–130, 2, 8, 62

[56] References Cited

U.S. PATENT DOCUMENTS

| | | | |
|---|---|---|---|
| 5,784,581 | 7/1998 | Hannah | 710/110 |
| 5,859,993 | 1/1999 | Snyder | 712/208 |
| 5,864,674 | 1/1999 | Goldman | 709/221 |
| 5,890,015 | 3/1999 | Garney | 710/62 |
| 5,933,656 | 8/1999 | Hansen | 710/62 |
| 5,974,486 | 10/1999 | Siddappa | 710/53 |

OTHER PUBLICATIONS

Compaq, Intel, Microsoft, NEC, Uviversal Serial Bus Specification, Revision 1.1, pp. 107, 119, 129, 135, 138, 147, 155, 215, 231–232, 254, 270, Sep. 23, 1998.

*Primary Examiner*—Meng-Ai T. An
*Assistant Examiner*—Stacy Whitmore
*Attorney, Agent, or Firm*—Rosenberg, Klein & Lee

[57] ABSTRACT

A USB multi-function connecting device includes a peripheral device connector and a pair of data upstream port and data downstream port, wherein the data upstream port is to connect the USB (Universal Serious Bus) port of a computer for receiving the peripheral device control command and data transmission from the computer. The peripheral device connector is adapted to be connected to a peripheral device and to freely define the peripheral device definition that represents the peripheral device connected thereto by the control circuit in response to the peripheral device control command from the computer so as to control the peripheral device connected thereto. The data downstream port provides a connection to an identical device in a next level or a further next level so as to interconnect the USB multi-function connecting devices to provide a multiplicity of statuses for operating different peripheral devices at the same time and thus providing a seriously-connected, multi-device, multi-function and multi-purpose USB connecting device.

12 Claims, 6 Drawing Sheets

USB MULTI-FUNCTION CONNECTING DEVICE

BACKGROUND OF THE INVENTION

1. Field of the Invention

The present invention relates to a USB multi-function connecting device and in particular to a connecting device for connecting computer peripheral devices for data transfer with the peripheral devices having user-defined and serious form connection.

2. Related Arts

Computers are currently used for data processing and managing and control. However, in the structure of the computer, besides the central processing unit that is used to perform calculation and instruction execution, there are a number of secondary devices and substructures which are mainly peripheral devices for data/signal input/output, such as keyboard, joy stick, modem, printer, scanner, card reader, bar code reader and so on. Each of peripheral devices has to communicate with the computer by means of an interface card which serves as the control and data transfer means of the peripheral device. The most well known interfaces for computer peripheral devices are RS-232 and RS-422 which are standard computer interfaces. Quite apparent, the interface connection is of vital importance for the operation of the peripheral devices.

Conventionally, the computers or processor based controllers used in industrial control operation usually adapt the so called multi-port card mode which has to be coupled to an ISA bus in order to function properly. Thus, this kind of ISA bus based multi-port card has several disadvantages, such as:

(1) The computer or controller has to be taken apart in order to install the multiport card.

(2) the number of the multi-port cards that may be used in a computer or a controller have to be the power of 2, such as 2, 4, 8 and 16 so that it imposes a constraint on the use of the interface card and the non-used cards would become a waste and consume additional power.

(3) the computer or controller has to be shut down or turned off in replacing or repairing a malfunctioning multi-port card which causes unnecessary trouble for those systems that are difficult or not allowed to shut down.

(4) it has a high manufacturing cost, is hard to maintain and has a poor efficiency in industrial utilization.

(5) the interface card of each of the multi-port cards may only be a single function interface, such as RS-232 or RS-422, and the peripheral device connected thereto must be fixed and cannot be changed freely, such as a joy stick or other fixed peripheral device; this limits the use and connection of the peripheral device to the computer; further it is very troublesome and requires more cost if it is to connect an RS-422 to an RS-232 interface and vice versa.

Figure 6:
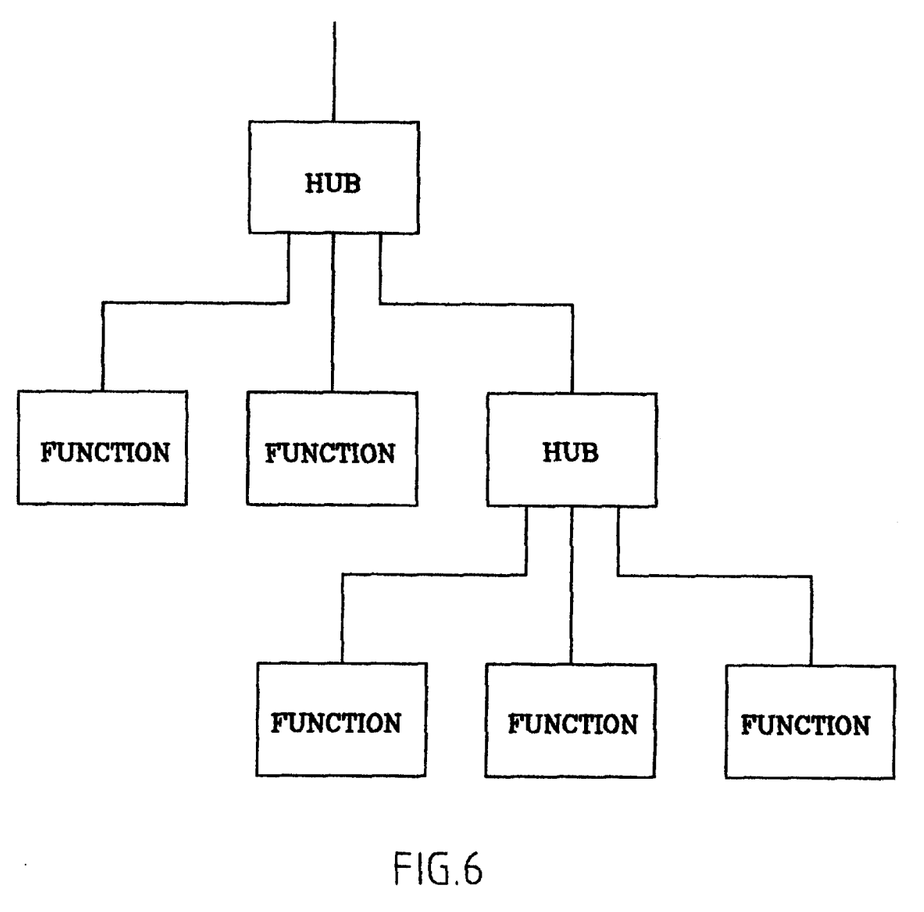
FIG. 6 is a system architecture of the conventional USB connector.

Further, currently, connections that made based on the USB mode are done by means of the bus topology, such as the connection architecture shown in FIG. 6, wherein each HUB can only be connected in series to other HUBs in the upstream direction and the downstream direction. Each HUB has a number of options of function. Although it is free of limitation in the selection of the functions, it has a disadvantage that when one of the HUB breaks down or malfunctions, then the HUBs that are located at lower (downstream) levels have to be shut off for the replacement or change of the malfunctioning upper level HUB. This significantly influences the operation and efficiency of the system. Further, each USB device is not matured function of each HUB is fixed, meaning it cannot be modified or defined in accordance with the peripheral device associated therewith. This makes the varieties and installation of the HUBs very complicated and it is difficult to design the overall system based on the use of the HUBs. Thus, in this case, a considerable inconvenience and difficulty would be had in mounting and using peripheral devices or peripheral monitoring devices with the HUB system.

In addition, in Taiwan patent publication No. 292369, a typical USB connection module is disclosed, which is, quite obviously, similar to the HUB system shown in FIG. 6, having a few fixed function modes to be user selected, namely it only has a choice between serving a joy stick or serving a mouse. Besides the same problem in peripheral device connection as that between HUBs, an even worse problem is that the function mode cannot be freely modified or changed in accordance with the peripheral device to be connected thereto and this makes the same constraint as that of the HUB system shown in FIG. 6 so that the system connection and the operation efficiency are similarly remarkably affected.

SUMMARY OF THE INVENTION

Thus, an object of the present invention is to provide a USB multi-function connecting device which comprises a peripheral device connector, a control circuit and a pair of data upstream port and data downstream port, wherein the data upstream port is to connect to the USB from a computer in order to receive the control signals from the computer to the peripheral device and to transfer data there between, the peripheral device connector is to connect to the peripheral device and to freely define the peripheral device definition associated with the peripheral device to be connected thereto in accordance with peripheral device control signal from the computer in order to control the peripheral device connected thereto and to connect to the data downstream port of the same series device in the next level or a further next level to have the connected devices to be defined in a condition for use with different peripheral device so that the USB multi-function connecting device may be freely connected to different peripheral device without limitation and the maintenance and/or repair maybe done without shutting down the computer. Further, the number of the connecting device may increase/decrease without constraint dependent upon the peripheral devices connected thereto so as to significantly reduce the system and equipment cost of USB peripheral device connection.

Another object of the present invention is to provide a USB multi-function connecting device and particularly the control circuit thereof, comprising a USB controller, a microprocessor, a memory module, a timer, an interrupt controller and an asynchronous receiver/transmitter, wherein the USB controller is connected to the USB output circuit of a computer and the next level and a further next level of USBs, the memory module comprising an electrical erasable programmable read only memory (EEPROM) for storing interface control information that defines and controls the peripheral device so as to allow the microprocessor in response to the software instruction from the computer to select the interface control program for a particular peripheral device from the EEPROM and to control the asynchronous receiver/transmitter to output it through peripheral device connector to the peripheral device connected thereto to be used by the peripheral device connected thereto, wherein the peripheral device may be any desired device, such as modem, mouse, keyboard, digital to analog convertor, sensor and those applicable in the industrial control engineering so as to have a better industrial utilization.

BRIEF DESCRIPTION OF THE INVENTION

The detailed structure and the operation thereof of the present invention will be apparent from the following detailed description and a more clear understanding of the technique and spatial configuration of the present invention may be obtained by referring to the drawings, in which.

DETAILED DESCRIPTION OF THE INVENTION

Figure 1:
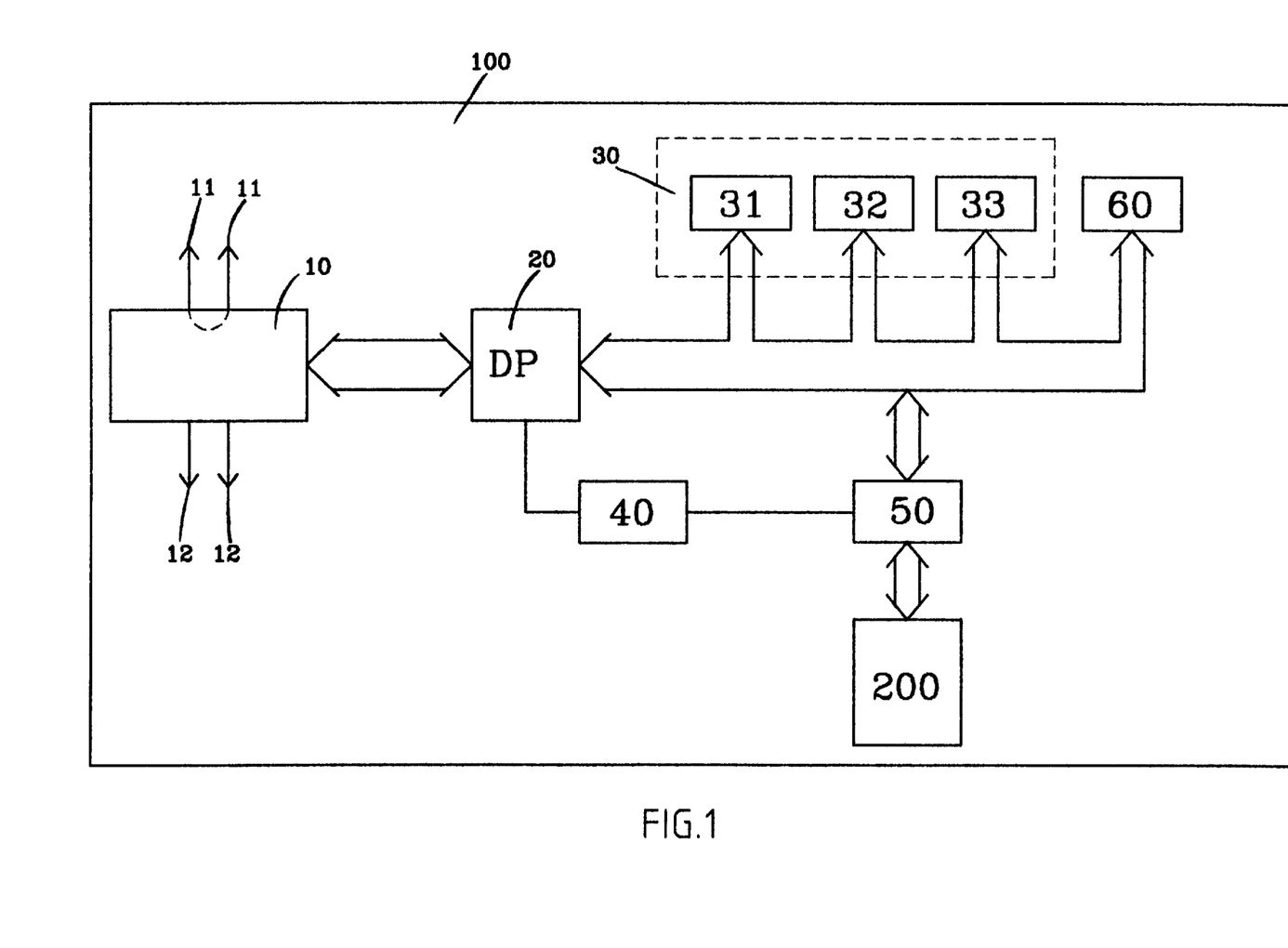
FIG. 1 is a circuit block diagram of the present invention.

With reference to the drawings and in particular to FIG. 1, the USB multi-function connecting device in accordance with the present invention comprises a control circuit 100 which includes a USB controller 10. The USB controller 10 is coupled to a pair of data upstream port 11 and data downstream port 12. The data upstream port 11 comprises an upstream D+ connection line and an upstream D-connection line, making use of the difference in voltage level to distinguish the data transmission of "0" and "1". One end of the D+ connection line and the D-connection line of the data upstream port 11 are linked to each other (as shown by phantom lines in FIGS. 1 and 3) in order to connect a USB output line of a computer. The D+ connection line and the D- connection line of the data downstream port 12 are respectively connected to the D+ and D- connection lines of the data downstream port 12 and data upstream port 11 of a next level and a further next level of the multi-function connecting devices in order to receive peripheral device control information and commands from the computer and a previous level of the USB multi-function connecting device.

A microprocessor 20 is connected to the USB controller 10 at a data port DP to receive the peripheral device control command and information from the USB controller 10 and to control signal output. The output control is achieved by means of an I/O port.

A memory module 30 is connected to a bus of the I/O port of the microprocessor 20, comprising a random access memory (DRAM) 31, a read only memory (ROM) 32 and an electrically erasable programmable read only memory (EEPROM) 33. The ROM 32 has firmware written therein for controlling peripheral devices, such as modem, printer, mouse, card reader, bar code reader or the like. The DRAM 31 receives and stores data transmitted through channels of the I/O port of the microprocessor 20 in the DRAM 31 for serving as a buffer which operates in a first-in-first-out (FIFO) fashion in handling the data so that the data may be handled later when the computer or the USB lines are less busy. Further, the DRAM 31 is also used to temporarily hold the data that is needed in executing the peripheral control command or software that is contained in the ROM 32.

Further, the EEPROM 33 is used to store the peripheral control information of the peripheral device selected by the user, namely the control information and transmission parameters defined by the user, such as the control information of the peripheral devices of modem, joy stick, mouse, A/D and/or D/A convertor, printer, scanner, digitizer, card reader, bar code reader or the like.

An interrupt controller 40 which may be set to be either lever trigger type or edge trigger type in the case of A/D convertor, D/A convertor or I/O peripheral devices to provide an interrupt vector signal to the microprocessor 20 or an asynchronous receiver/transmitter 50. Alternatively, a timer 60 is provided to interrupt a short interval within a given period of time. Within the interrupted interval, if the information of the A/D convertor, D/A convertor or I/O device matches the information set by the user, then the status or the related information of the D/A convertor or the A/D convertor is stored and the status signal is fed back to the USB controller 10 via the microprocessor 20. A connection will be later established by the USB controller 10 to the computer when the USB line that connects to the computer is idle.

The asynchronous receiver/transmitter 50 is connected to the end of the I/O port of the microprocessor 20. The asynchronous receiver/transmitter 50 may be of any suitable type, such as the so called universal asynchronous receiver/transmitter (UART) shown in the drawings, but not limited thereto. The asynchronous receiver/transmitter 50 provides a connection to a peripheral device 200, which may be a modem, printer, scanner, card reader, bar code reader or the like. These peripheral devices 200 are driven by means of standard RS-232 or RS-422 device. During the data receiving or transmitting operation of the asynchronous receiver/transmitter 50, when the receiving/transmitting operation is completed, a receiving/transmitting interrupt signal is sent to the interrupt controller 40 to signal the microprocessor 20 that data is to be received from or transmitted to the computer. The data is transmitted in a series fashion and if the computer or the USB circuit connecting the computer is busy, then the data that is to be received or transmitted is temporarily stored in the DRAM 31 of the memory module 30 and will be retrieved from the DRAM 31 and transmitted in the FIFO fashion when the computer or USB circuit is not busy.

Figure 2:
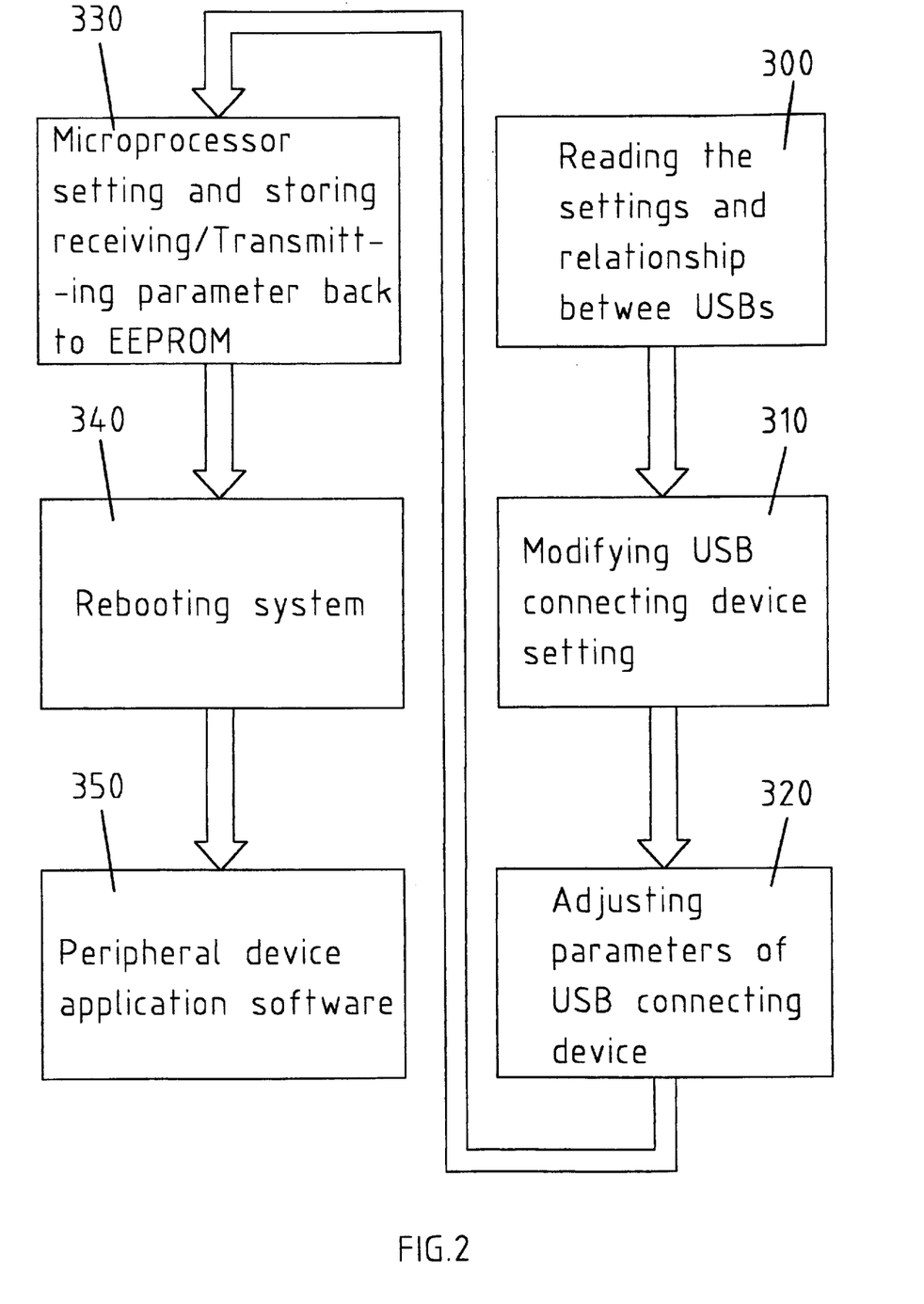
FIG. 2 is a flow chart of the control of the microprocessor adapted in the present invention.

Referring to FIG. 2, which shows a control flow chart of the system control operation in the computer, the control flow chart comprises reading and obtaining the parameter settings and relationship between the USB multi-function connecting devices on the USB circuit, step 300; modifying the settings of the function of the USB multi-function connecting device, namely setting the control information that is used to retrieve the function of a desired peripheral device or a particular peripheral device from the EEPROM 33, step 310; adjusting the parameters of the USB multi-function connecting device or changing the designated peripheral device, namely after the microprocessor 20 reads the control information from the EEPROM 33, setting the related transmitting/receiving parameters, step 320; the microprocessor completely setting the transmitting/receiving parameters of the control information and storing them back to the EEPROM 33, step 330; rebooting the computer after the software and hardware connection is completed and the parameters are set, namely resetting the particular function to function properly in order to confirm that the software and hardware are correct, step 340; and executing the application software of the peripheral device, step 350. After the execution of the control flow chart shown in FIG. 2, the USB connecting device in accordance with the present invention may then be used to cooperate with the peripheral device in a multi-function and multi-purpose fashion.

Figure 3:
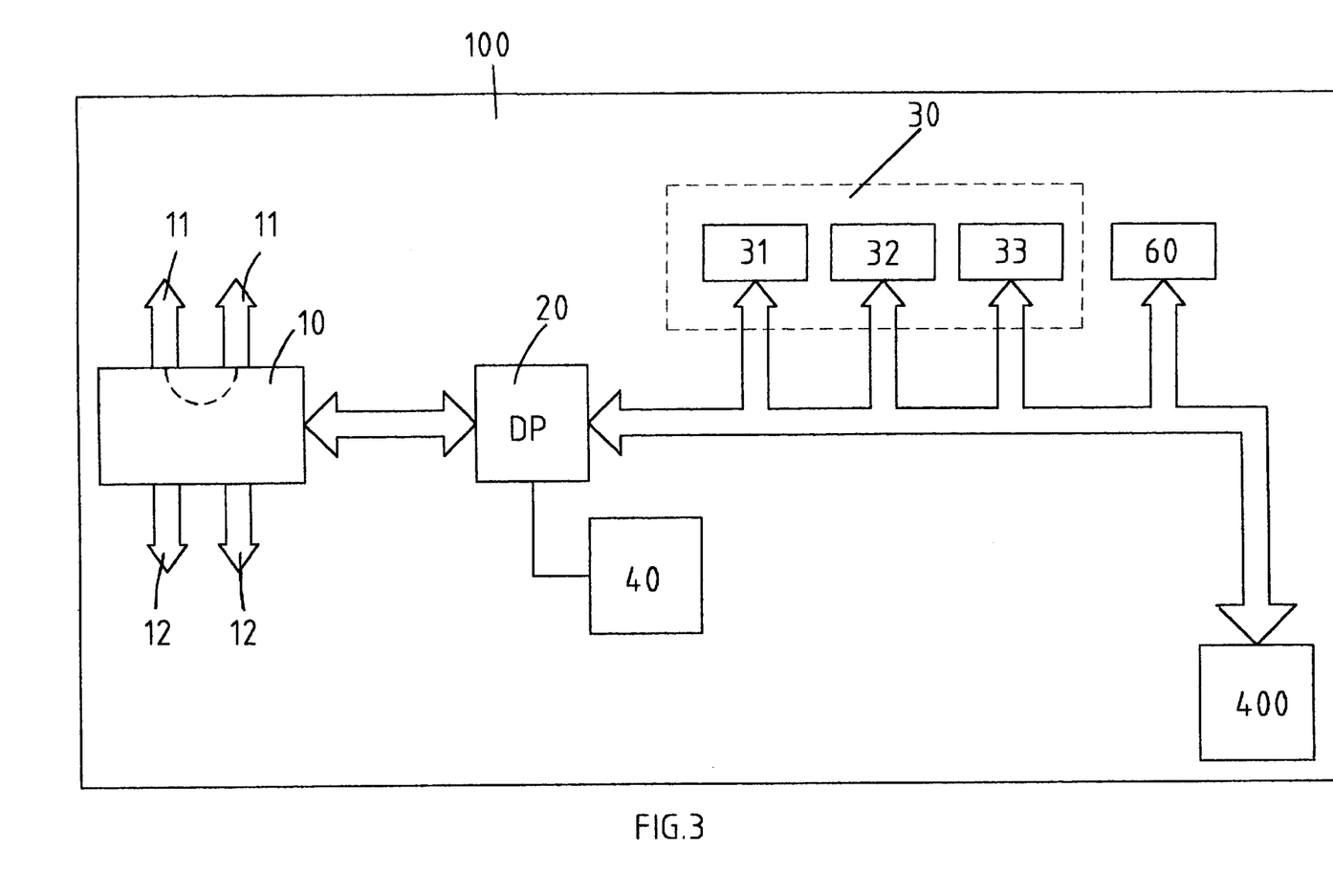
FIG. 3 is a circuit block diagram in accordance with a preferred embodiment of the present invention.

With reference to FIG. 3, which shows the block circuit diagram of another embodiment of the USB connecting device in accordance with the present invention, wherein, contrary to FIG. 1, an I/O bi-directional transmission peripheral device 400 is connected to the end of the I/O bus of the microprocessor 20, such as an industrial A/D convertor, D/A convertor, sensor, liquid level controller. It may also take the definition and function setting mode operation described with reference to FIGS. 1 and 2 to allow the I/O bi-directional transmission peripheral device 400 to have the effectiveness of multi-function and multi-purpose so that the USB connecting device of the present invention may be used to connect not only the regular computer peripheral devices, but also the industrial control system in order to increase the value and industrial utilization thereof.

Figures 4A, 4B:
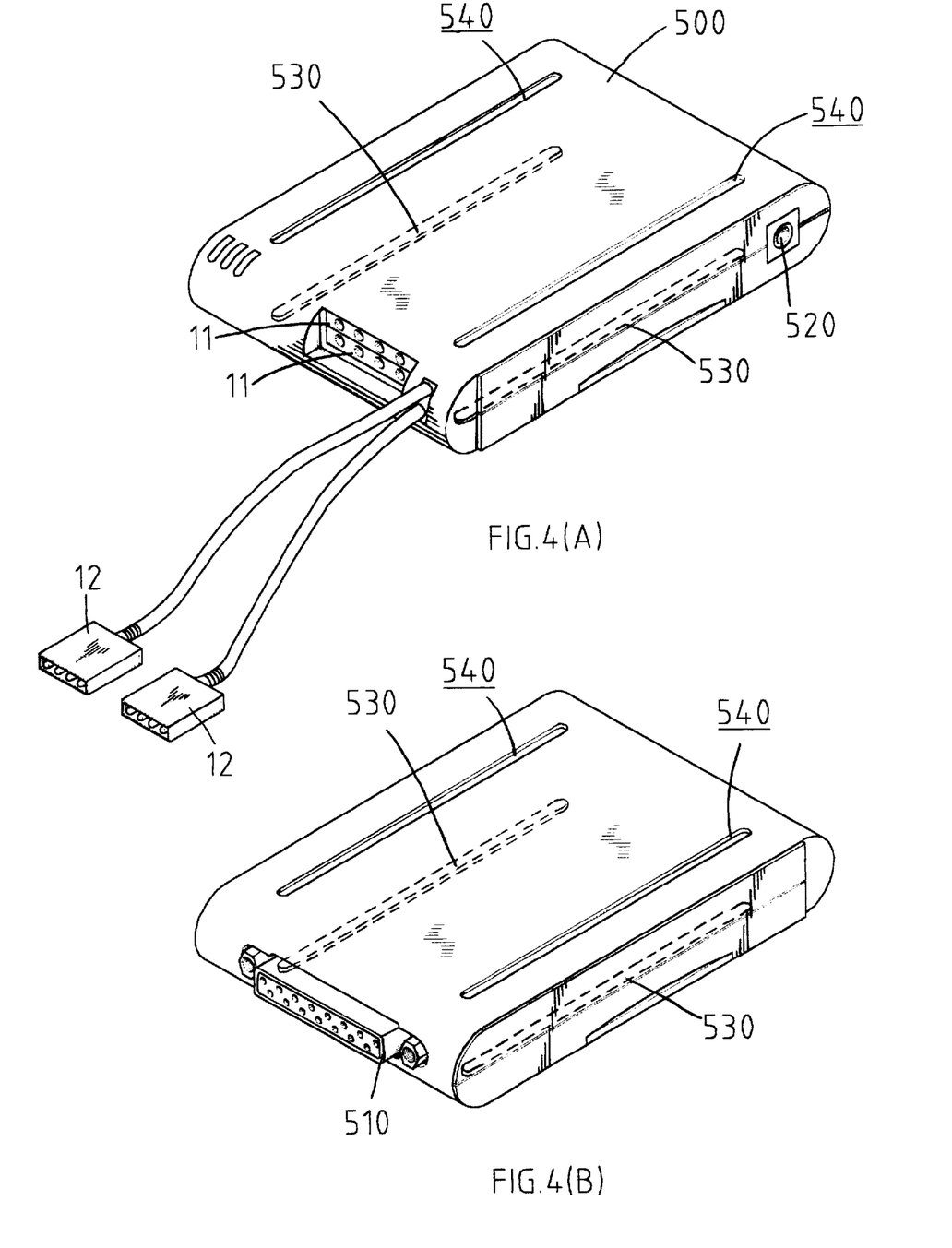
FIG. 4a is a perspective view of a preferred embodiment in accordance with the present invention.
FIG. 4b is a perspective view of another preferred embodiment in accordance with the present invention.

With reference to FIGS. 4a and 4b, which are perspective views of different embodiments of the USB connecting device in accordance with the present invention. A casing 500 encases the circuit of the USB connecting device shown in FIGS. 1 and 3. The data upstream port 11 and the data downstream port 12 are both arranged at the front side of the casing 500 to allow the data upstream port 11 and the data downstream port 12 of the USB connecting devices to connect to each other. A peripheral device connector 510 is provided on the rear side of the casing 500 which is to connect the peripheral device 200 or I/O bi-directional transmission device 400 so that it may have a variety of types and may be a standard DB-25 connector, as shown in FIG. 4b. The casing 500 also has an electrical socket 520 provided at a suitable position thereon for connection with an external power source which allows the USB connecting device encased in the casing 500 to receive a DC current from an external adaptor or power source, if desired.

Besides, it should be noted that as shown in FIGS. 4a and 4b, at least one rib 530 and a corresponding slot 540 are respectively provided on the top side and bottom side of the casing 500 for stacking over each other.

Figure 5:
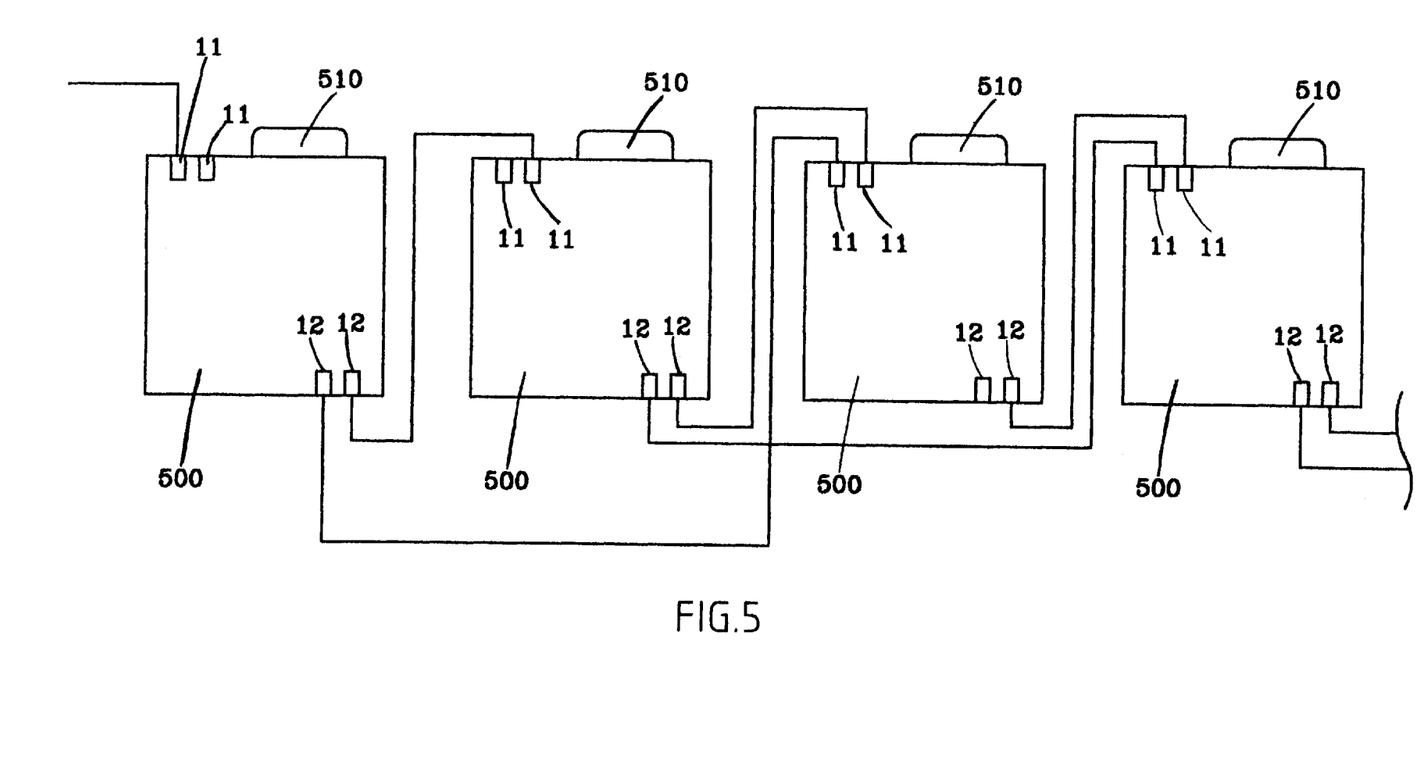
FIG. 5 shows an application of the present invention.

With reference to FIG. 5 which shows an application of the USB connecting device in accordance with the present invention shown in FIGS. 1–4b, the data upstream port 11 of each of the USB connecting devices is connected to the data downstream port 12 of a previous level or a further previous level USB multi-function connecting device and the data downstream port 12 of each of the USB multi-function connecting devices is connected to the data upstream port 11 of a next level or a further next level USB multi-function connecting device so as to form a circuit architecture of systematic jump connection. By means of the circuit connection shown in FIG. 5, the computer does not need to shut down in order to repair any malfunctioning USB connecting device. Further, the USB multi-function connecting device allows a user to freely define the peripheral device connected thereto via the computer so that it is more effective in operation. Besides, the number of the devices is not limited to be the power of 2 and may be determined in accordance with the number of the peripheral devices connected thereto. This significantly cuts down the cost used in connecting and controlling the peripheral device of the computer USB system.

The above description is made with respect to the preferred embodiment of the present invention and for those skilled in the art, it is possible to make a variety of modifications and changes to the above-described specific embodiment without departing from the scope and spirit of the present invention. All these modifications and changes should be considered within the scope of the present invention as defined in the appended claims.

What is claimed is:

1. A USB multi-function connecting device, comprising:

at least one pair of data upstream port and data downstream port, the data upstream port being connected to a USB circuit of a computer or the data upstream port of a previous level of USB multi-function connecting device in order to receive control command and information from the computer;

a control circuit, comprising a USB controller, a microprocessor, a memory module, an interrupt controller, a timer and an asynchronous receiver/transmitter, wherein the USB controller is connected to the data upstream port and the data downstream port for receiving data from the data upstream port and outputs data at the data downstream port, the microprocessor having a data port connected to the USB controller for receiving input data therefrom or supplying output data to the USB controller, the memory module connected to an I/O port of the microprocessor for providing instruction execution, data storage, buffering function of the microprocessor and storage of function and control information of peripheral devices so as to allow the microprocessor to re-define and store the function and control information of the peripheral devices back thereto in response to a peripheral device control command and data transmission from the computer, the interrupt controller providing interrupt control command and interrupt control vector to the microprocessor and the asynchronous receiver/transmitter respectively, the asynchronous receiver/transmitter being connected to an end of the I/O port of the microprocessor to receive a final peripheral device control command and instruction from the microprocessor and output a corresponding peripheral device control command; and a peripheral device connector adapted to connect to a variety of peripheral devices for receiving the peripheral device control command from the asynchronous receiver/transmitter of the control circuit in order to control the peripheral device connected thereto.

2. The USB multi-function connecting device as claimed in claim 1, wherein the pair of data upstream port and data downstream port respectively comprise a D+ connection line and a D– connection line which distinguish data transmission of "0" and "1" based on voltage difference.

3. The USB multi-function connecting device as claimed in claim 1, wherein the memory module comprising:

a read only memory for storing firmware of peripheral device control function;

a dynamic static random access memory for storing data transmitted through channels of the I/O port of the microprocessor to serve as a buffer for data transmission to allow the data to be processed at the time when the computer and the USB circuit are not busy and for temporarily storing data needed in instruction execution/data calculation of the control instruction that is performed by the microprocessor; and an electrical erasable programmable read only memory for storing the function control information of a user selected peripheral device which is the control function information of a standard RS-232 or RS-422 peripheral device connection port defined by a user so as to allow the microprocessor, in response to the peripheral device control command from the computer, to retrieve the definition of the corresponding peripheral device information and storing it back thereto.

4. The USB multi-function connecting device as claimed in claim 3, wherein the dynamic static random access memory of the memory module is operated in a FIFO fashion when it serves as the data transmission buffer.

5. The USB multi-function connecting device as claimed in claim 1, wherein the interrupt controller of the control circuit in controlling interruption of an A/D convertor, D/A convertor type peripheral device is operated in a level trigger or edge trigger fashion to timely generate an interrupt vector signal to the microprocessor or the asynchronous receiver/transmitter at the final output end.

6. The USB multi-function connecting device as claimed in claim 1, wherein the interrupt controller of the control circuit comprises a timer for interrupting for a predetermined time interval at a predetermined time and during the interrupted interval, if an A/D convertor, D/A convertor or I/O port device information of the peripheral device matches the user-defined conditions, then the status or the related A/D or D/A convertor information is temporarily stored and fed back to the USB controller via the microprocessor to be connected to the computer by the USB controller when the USB circuit that is connected to the computer is not busy.

7. The USB multi-function connecting device as claimed in claim 1, wherein the asynchronous receiver/transmitter of the control circuit comprises a universal asynchronous receiver/transmitter.

8. The USB multi-function connecting device as claimed in claim 1, further comprising a control procedure which is transmitted to the microprocessor by the computer via the USB controller to be executed, the control procedure comprising the following steps:

(1) reading and obtaining the parameter settings and relationship between the USB multi-function connecting devices on the USB circuit;

(2) modifying the settings of the function of the USB multi-function connecting device, namely setting the control information that is used to retrieve the function of a particular peripheral device;

(3) adjusting the parameters of the USB multi-function connecting device, namely after the microprocessor reads the control information from the electrical erasable programmable read only memory, setting the related transmitting/receiving parameters;

(4) the microprocessor setting the control information of the transmitting/receiving parameters and storing them back to the electrical erasable programmable read only memory;

(5) rebooting the computer after setting a particular function routine; and (6) executing application software of the peripheral device.

9. The USB multi-function connecting device as claimed in claim 1, wherein the peripheral device connector comprises a standard DB-25 or DB-9 connector.

10. The USB multi-function connecting device as claimed in claim 1, wherein the connecting device comprises a casing encasing the data upstream port, the data downstream port, the control circuit ad the peripheral device connector.

11. The USB multi-function connecting device as claimed in claim 10, wherein the casing comprises an external power connection socket for connecting to a direct current supplied from an external power source.

12. The USB multi-function connecting device as claimed in claim 10, wherein the casing comprises at least one rib and a corresponding slot respectively formed on top side and bottom side of the casing to allow a number of casings to stack over each other.

* * * * *